United States Patent [19]

Stewart

[11] Patent Number: 5,026,503

[45] Date of Patent: Jun. 25, 1991

[54] COMPOSITION AND METHOD FOR REMOVING HYDROGEN SULFIDE FROM GAS STREAMS

[75] Inventor: Robert C. Stewart, Tulsa, Okla.

[73] Assignee: Amoco Corporation, Chicago, Ill.

[21] Appl. No.: 383,844

[22] Filed: Jul. 21, 1989

[51] Int. Cl.$^5$ .................. C01B 17/20; C01B 17/04
[52] U.S. Cl. .................. 252/192; 252/191; 252/189; 423/226; 423/227; 423/228; 423/576.6
[58] Field of Search .............. 423/226, 227, 228, 277, 423/576.6; 252/189, 192, 191

[56] References Cited

U.S. PATENT DOCUMENTS

| | | | |
|---|---|---|---|
| 3,097,925 | 7/1963 | Pitts, Jr. et al. | 23/225 |
| 3,580,950 | 5/1971 | Berworth | 562/565 |
| 3,676,356 | 7/1972 | Roberts et al. | 252/192 |
| 3,897,219 | 7/1975 | Sibeud et al. | 23/288 A |
| 3,975,508 | 8/1976 | Richardson et al. | 423/571 |
| 4,009,251 | 2/1977 | Meuly | 423/573 G |
| 4,011,304 | 3/1977 | Mancini et al. | 423/573 G |
| 4,014,983 | 3/1977 | Hardison | 423/575 |
| 4,036,942 | 7/1977 | Sibeud et al. | 423/573 |
| 4,076,621 | 2/1978 | Hardison | 210/60 |
| 4,189,462 | 2/1980 | Thompson | 423/576.6 |
| 4,218,342 | 8/1980 | Thompson | 252/431 C |
| 4,238,462 | 12/1980 | Hardison | 423/224 |
| 4,374,104 | 2/1983 | Primack | 423/576.6 |
| 4,455,287 | 6/1984 | Primack et al. | 423/576.6 R |
| 4,482,524 | 11/1984 | Hardison | 422/170 |
| 4,622,212 | 11/1986 | McManus et al. | 423/226 |
| 4,705,676 | 11/1987 | Fong et al. | 423/567 A |
| 4,774,071 | 9/1988 | Jeffrey et al. | 562/565 |

OTHER PUBLICATIONS

Schick, M. J., Surfactant Science Series, vol. 1, Nonionic Surfactants, 1967, p. 1.

Primary Examiner—Deborah L. Kyle
Assistant Examiner—Valerie Fee
Attorney, Agent, or Firm—Marcy M. Lyles; Fred E. Hook; L. Wayne White

[57] ABSTRACT

An improved aqueous catalytic oxidation-reduction composition for oxidizing hydrogen sulfide to produce elemental sulfur and a method of removing hydrogen sulfide from a gas stream whereby a gas stream containing hydrogen sulfide is brought into contact with an aqueous catalytic oxidizing reaction composition containing a water soluble polyvalent metal salt having metal in the highest valence state and at least one nonionic surfactant having an HLB of from about 8 to about 10, preferably about 8.5 to about 9, which is adapted to wet the elemental sulfur formed. The nonionic surfactant is present in the reaction solution in an amount sufficient to substantially prevent formation of sulfur froth at the surface of the reaction solution and to cause the sulfur to precipitate as a granular solid that can be recovered by filtration, by centrifucation, or other similar means.

23 Claims, 1 Drawing Sheet

COMPOSITION AND METHOD FOR REMOVING HYDROGEN SULFIDE FROM GAS STREAMS

FIELD OF THE INVENTION

The present invention relates generally to the removal of hydrogen sulfide gas from a fluid stream, and more particularly, to an improved aqueous reaction solution useful for continuous liquid phase oxidation of hydrogen sulfide to elemental sulfur and water and to more efficient removal of the elemental sulfur from the aqueous reaction solution.

BACKGROUND OF THE INVENTION

Removal of hydrogen sulfide from a fluid stream by a liquid phase oxidation is known to the industry. See, for example, U.S. Pat. Nos. 3,097,925; 3,676,356; 3,897,219; 3,975,508; 4,009,251; 4,011,304; 4,014,983; 4,036,942; 4,076,621; 4,189,462; 4,218,342; 4,238,462; 4,374,104; 4,455,287; 4,482,524; 4,622,212; 4,705,676; and British Patent No. 948,270; the disclosures of which patents are incorporated herein by reference. U.S. Pat. No. 4,374,104 is of particular interest in showing a composition containing chelated metal catalysts and surfactants of the generic type used in the present invention. The liquid phase oxidation process, in general, comprises bringing a hydrogen sulfide gas-containing stream into intimate contact with an aqueous oxidizing reaction solution. The reaction solution preferably comprises an aqueous oxidizing solution containing polyvalent metal ions (M) as a catalyst which receives electrons from the sulfide ion in aqueous solution to form elemental sulfur while reducing the metal ions from their higher valence state to a lower valence state, as illustrated by the following equation:

$$S^{-2} + 2M^{+3} = S^O + 2M^{+2}$$

In order to regenerate the catalytic metal ions to their original higher valence state, the reduced reaction solution is contacted with oxygen dissolved in the aqueous reaction solution, as illustrated by the following equation:

$$\tfrac{1}{2}O_2 + 2M^{+2} + H_2O = 2(OH)^- + 2M^{+3}$$

Among the polyvalent metals which can be used in the aqueous reaction solution in ionic form are iron, copper, vanadium, manganese, platinum, tungsten, nickel, mercury, lead, and tin, with iron being preferred.

In order to provide an economical, workable, continuous process for removing hydrogen sulfide gas from a fluid stream in which polyvalent metal ions are used to effect catalytic oxidation of hydrogen sulfide, it is desirable to provide an aqueous catalytic reaction solution which is (a) stable at slightly acidic and alkaline pH values over a relatively wide pH range (preferably from about pH 5.5 to pH 13), and which is (b) capable of being rapidly regenerated after effecting oxidation of the hydrogen sulfide. This regeneration step (b), should occur without significant loss of the catalytic metal ions and/or sulfur and it should occur without an objectionable buildup of elemental sulfur in the reaction solution. While certain aqueous oxidizing reaction solutions containing a polyvalent metal ion catalyst, such as vanadium in the Stretford process, are relatively stable, other aqueous reaction solutions which contain a metal catalyst, such as iron, must be stabilized against precipitation of metal hydroxides and metal sulfides. Such stabilization is achieved by including in the reaction solution a chelating agent which maintains the metal catalyst in solution in both its higher and lower valence states in alkaline solution, and preferably over the pH range from about 5.5 to about 13. The continuous oxidation of hydrogen sulfide to form elemental sulfur by a chelated aqueous catalytic metal oxidation-reduction reaction solution and the regeneration of the reduced aqueous catalytic metal reaction solution can be represented by the following equations:

(1) Oxidation-Reduction:

$$H_2S(gas) + 2(M\ chelate)^{+3} \rightarrow 2H^+ + S^o + 2(M\ chelate)^{+2}$$

(2) Regeneration:

$$\tfrac{1}{2}O_2(gas) + 2(M\ chelate)^{+2} = 2(OH)^- + 2(M\ chelate)^{+3}$$

It is generally desirable to maintain a minimum concentration of between about 0.1 and about 10 weight percent sulfur in the reaction solution in order to increase the overall size of the sulfur particles in the reaction solution. A sulfur concentration in excess of about 10 weight percent can result in plugging of equipment and also interfere with the catalytic reactions. The most economical means for reducing the concentration of elemental sulfur in the reaction solution is to cause the sulfur to settle out of the reaction solution. However, because the elemental sulfur is formed while rapidly mixing a large volume of hydrogen sulfide-containing gas with a large body of aqueous reaction solution, a gas-liquid-solid sulfur dispersion is formed as a result of a large volume of gas moving at a relatively high velocity relative to a liquid reaction solution, and extremely fine solid elemental sulfur particles are formed in the reaction solution. Such fine particles have surface properties which cause the particles to adhere to minute gas bubbles in an aqueous reaction solution and float to the surface where they form a thick layer of froth on the surface of the reaction solution. This prevents rapid and complete settling of the sulfur and it increases the difficulty f separating and recovering the sulfur from the reaction solution. Treated gas compressor suction manifolds and screens tend to plug with fine sulfur particles requiring troublesome and time consuming cleaning and maintenance. Absorber internals also tend to become clogged with sulfur resulting in increased gas pressure drops. This also requires frequent plant shutdowns for cleaning.

It is, therefore, an object of the present invention to provide an improved aqueous liquid phase oxidizing solution from which elemental sulfur formed therein can be more efficiently removed.

It is also an object of the present invention to provide a substantially greater concentration of sulfur in the solution withdrawn from the reaction zone than has heretofore been achieved.

It is a further object of the present invention to provide an improved aqueous metallic chelated oxidation-reduction reaction solution adapted for liquid-phase oxidation of hydrogen sulfide gas to form elemental sulfur, wherein the sulfur does not remain suspended in the reaction solution for a prolonged period of time or float to the surface and form a layer of froth on the surface of the reaction solution.

It is still another object of the present invention to provide a more economical process for the removal of hydrogen sulfide gas from a fluid stream and recovery of elemental sulfur from a catalytic liquid-phase oxidizing aqueous solution.

Other objects of the present invention will be apparent from the accompanying detailed description and claims to follow.

SUMMARY OF THE INVENTION

The foregoing objects of the present invention are achieved by incorporating in an aqueous catalytic oxidizing reaction solution a small but effective amount of one or more nonionic surfactants having a hydrophilic-lipophilic balance (HLB) from about 8 to about 10, preferably from about 8.5 to about 9.0. "HLB" being defined as E/5 where E is the weight percent of oxyethylene content. It was discovered that surfactants with HLB's greater than about 10 tended to foam severely when contacted with finely divided gas bubbles. The higher the HLB, the greater the foaming tendency. Surfactants with HLB's less than about 8 have reduced water solubility and are ineffective in coating finely divided sulfur particles in a continuous aqueous solution and are, therefore, ineffective in reducing sulfur froth and increasing settling rates. Such nonionic surfactants must be compatible with the catalytic aqueous phase oxidizing reaction solution and should thoroughly wet the surface of the particles of elemental sulfur formed when the aqueous reaction solution is brought into intimate contact with a hydrogen sulfide-containing gas stream. By using such nonionic surfactants, the particles of elemental sulfur formed in the reaction do not remain suspended in the reaction solution for prolonged periods of time or form a layer of sulfur froth on the surface of the reaction solution. The sulfur particles tend to be larger in size than sulfur particles obtained in in the prior art process of U.S. Pat. No. 4,374,104. The sulfur particles of the present invention are readily precipitated and recovery is accomplished by filtration, centrifugation, or other similar means.

Essentially, any nonionic surfactant having an HLB of from about 8 to about 10 can be used in the present invention. Such surfactants are species within the generic teachings of Primack in U.S. Pat. No. 4,374,104. The surfactants which are preferred in the present invention are the low foaming, nonionic surfactants prepared by reacting a higher linear alcohol or carboxylic acid or a phenolic compound with ethylene oxide or like alkoxide. Such compounds are illustrated in Schick, M. J., Nonionic Surfactants, 1967, Dekker, N.Y. Nonionic surfactants of the class comprising ethoxylated alkyl phenols having from about 8 to 10 carbon atoms in the alkyl group (such as nonylphenoxypoly (ethoxy) ethanols) and containing from an average of about 3 to about 6 ethylene oxide groups per alkylphenol are particularly effective and especially preferred for use in the present invention. It was surprising to learn that this class of nonionic surfactants did not require the use of an antifoaming agent in combination therewith in order to control the formation of foam in the reaction solution in view of the disclosure in U.S. Pat. No. 4,374,104.

The catalytic iron oxidation-reduction reaction solution of the present invention can be prepared by dissolving a suitable iron salt in water, or an aqueous alcohol solution, together with a suitable salt of the chosen chelating agent and adding the required amounts of one or more of the nonionic surfactants. An alkaline material (e.g., KOH) is then added to this aqueous solution, or aqueous alcohol solution, to provide a concentrate which can be diluted with water as required to obtain the operating solution having the desired pH and iron content.

For efficient and economical operations, the amount of surfactant used in the composition should be no greater than required to thoroughly wet the particles of elemental sulfur formed in the reaction solution, as indicated by the absence of sulfur froth on the surface of the reaction solution. It has been found that the amount of surfactant required in the reaction solution for efficient operation ranges from about 10 parts per million (ppm) to about 20 ppm by weight neat surfactant. Higher reaction temperatures generally require less surfactants.

The iron salt used in preparing the concentrate is preferably a ferric salt, such as ferric chloride, ferric sulfate, or ferric nitrate. However, it is also possible to use a ferrous salt, such as ferrous sulfate, but in such instances the reaction solution must be aerated prior to use in order to ensure oxidation of the iron to the ferric state. The alkaline material used to adjust the reaction solution pH is preferably sodium carbonate, potassium carbonate, sodium hydroxide, potassium hydroxide or mixtures thereof, although other alkaline compounds which do not adversely affect the reaction solution can be used.

The iron content of the dilute operating reaction solution can vary over a wide range, dependent upon the gas being treated and other conventional process factors. Reaction solutions having an iron content of from about 5 ppm to about 5000 ppm are typically used, with 200 ppm to 2000 ppm being preferred. It has been observed that when a polyamine chelated iron is used in high concentration (i.e., above 5000 ppm), objectionably high losses of the polyamine chelating agent can occur. Using a polyhydroxy-type chelating agent of the type disclosed herein in combination with the polyamine chelating agent reduces the loss of iron, according to Primack in U.S. Pat. No. 4,374,104. In preparing the concentrate, it is desirable to add both the polyamine and the polyhydroxy-type chelating agents to the aqueous iron solution before adding the alkaline agent so as to avoid precipitation of iron as iron hydroxide. The presence of the two types of chelating agents improves the stability of the reaction solution and minimizes the care required in making up the final reaction solution, according to Thompson in U.S. Pat. No. 4,189,462.

Among the chelating agents which can be used to stabilize the catalytic agents, such as ferric ions and ferrous ions, in an aqueous oxidation-reduction reaction solution are polyamine, polyamino alkyl and polyamine hydroxy alkyl polycarboxylic acids, such as amino acetic acids, and soluble salts thereof (particularly, the alkali metal salts and ammonium salts) derived from ethylenediamine, diethylenetriamine, 1,2-propylenediamine, and 1,3-propylenediamine, including ethylenediaminetetraacetic acid (EDTA), 2-hydroxyethyl ethylenediaminetriacetic acid (HEDTA), nitrilotriacetic acid (NTA), diethylenetriaminepentaacetic acid, N-hydroxyethyl ethylenediaminetriacetic acid, and the trisodium salt of N-hydroxyethyl ethylenediaminetriacetic acid ($Na_3$-HEDTA) acetic acid derivatives of cyclic 1,2-diamines, such as 1,2-diaminocyclohexane-N,N-tetracetic acid, and 1,2-phenylenediamine-N,N-tetracetic acid, the amides of polyamino acetic acids (see, for example, U.S. Pat. No. 3,580,950) and polyhydroxy chelating agents, such as the sugars, sugar acids, or the reduced sugars, including both monosaccharides and polysaccharides. Examples of suitable polysaccharide sugars are the di-saccharides such as sucrose, lactose, maltose, and examples of the monosaccharides are sucose and fructose. Suitable sugar acids include the disaccharide sugar acids and monosaccharide sugar acids, such as the gluconic acid and glucoheptanoic acid, which may be used in the form of the alkali metal salts, particularly their sodium salts. However, the reduced sugars are preferred to other mono- and polysaccharide chelating agents since there is no possibility of hydrolysis or oxidation at potential aldehyde groups. The examples of suitable reduced sugars are the reduced monosaccharides and reduced disaccharides, including sorbitol and mannitol. The polyhydroxy chelating agents can be used in combination with one or more of the other chelating agents, according to Thompson in U.S. Pat. No. 4,189,462.

Various methods can be used to effect the required intimate contact between the hydrogen sulfide-containing stream and the aqueous reaction solution. The type of process flow best suited for the catalytic oxidation reduction using a catalytic iron oxidizing solution in the present invention will depend upon the hydrogen sulfide content of the gas stream being treated and the nature of the other components of the gaseous stream. FIG. 1 illustrates a process flow in which the oxidation of hydrogen sulfide and the regeneration of a chelated iron oxidizing solution are carried out concurrently in the same reaction vessel. This arrangement is referred to herein as aerobic absorption processing or aerobic operation. However, the oxidation of hydrogen sulfide can be carried out in one chamber and the regeneration of the solution in a second chamber, if desired. The flow process of FIG. 1 is particularly adapted for use in treating a waste gas stream containing a relatively low concentration of hydrogen sulfide (e.g., 500 ppm or less) and which has a relatively high concentration of oxygen (e.g., 20% by volume), such as contaminated ventilating air, the offgas of a xanthate plant producing rayon or cellophane, or gas from a sewage plant.

Figure 1:
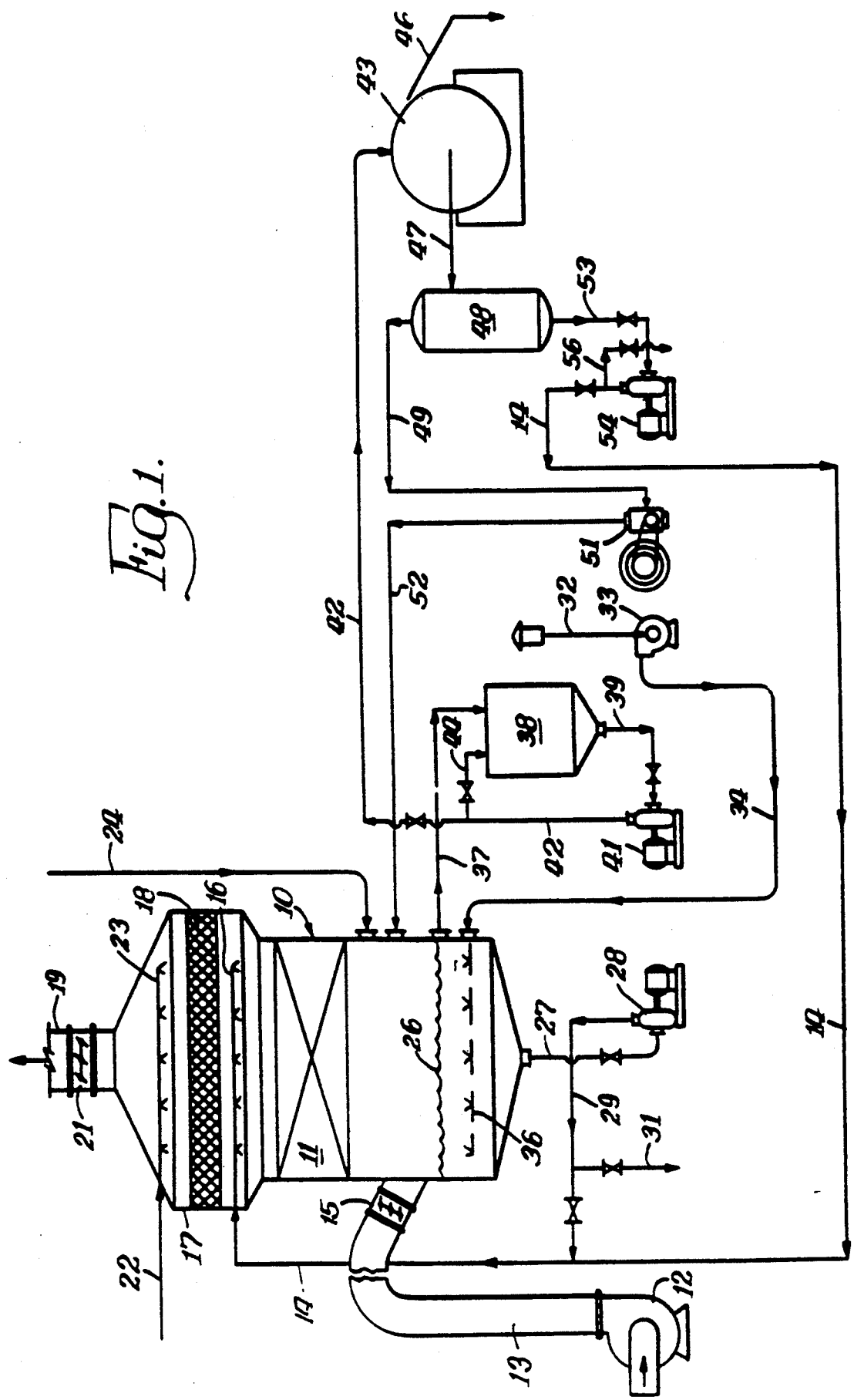
Referring to FIG. 1, the catalytic oxidation-reduction reaction system comprises an absorption tower or scrubber 10 containing a central contact zone illustrated schematically at 11. This zone may be a simple straight chamber or may comprise any suitable liquid-vapor contacting means such as the conventional packed beds, plates, or trays. The inlet gas containing hydrogen sulfide is introduced into the tower 10 through a blower 12 and a conduit 13 below the contact zone 11 for passage upwardly therethrough. A flow control damper 15 is provided in the conduit 13. The chelated iron solution of the present invention is supplied by a line 14 to spray head or distribution nozzle 16 located in an enlarged upper section 17 of the tower 10 and passes downwardly through the contact zone 11 in countercurrent relation to the upwardly flowing gas stream. The treated gas exits from the tower 10 through the demister zone 18 in the section 17 and an outlet 19 having a flow control damper 21. Makeup water may be added to the system, as required, through a line 22 communicating with spray 23 located above the demister zone 18. In the alternative, the water used to wash the sulfur filter cake can be returned to the system as makeup water. Makeup chelated iron solution may be added, as required, through line 24 communicating with the tower 10 below the contact zone 11.

In the arrangement illustrated in FIG. 1, the bottom portion of the absorption tower 10 is used as a reservoir for the chelated iron solution which fills the bottom of the tower to a level, included at 26, below the point of introduction of gas through the conduit 13. The chelated iron solution is continuously recirculated from the bottom of the tower 10 to the spray nozzle 16 through a line 27, a pump 28, and a line 29 connected to the line 14. A portion of the chelated iron solution may be bled from the system through a line 31, as may be required.

When treating gases having a low concentration of hydrogen sulfide and where the gas stream contains a relatively high concentration of oxygen, it is not necessary to introduce an additional oxygen-containing gas stream into the tower 10 to effect regeneration of the solution, but when treating gas containing more than about 1000 ppm hydrogen sulfide, regeneration of the chelated iron solution can be effected by drawing atmospheric air through a screened inlet 32 by a blower 33, and the air is supplied through a line 34 to spray nozzles 36 disposed in the lower portion of the tower 10 so that the air is bubbled through the volume of solution in the bottom of the tower 10, thereby thoroughly aerating the solution and oxidizing the ferrous iron to ferric iron. The effluent air passes upwardly through the tower 10, along with a feed gas and exits with the treated gas through the outlet 19.

In the contact zone 11, the hydrogen sulfide and the inlet gas is oxidized to elemental sulfur by the chelated iron solution, as heretofore described. The sulfur solids formed are present as a slurry in the treating solution in the bottom of the tower 10. A portion of this slurry is continuously withdrawn from the tower 10 through line 27 to a slurry tank 38. The sulfur slurry is withdrawn from the slurry tank 38 through a line 39 by a pump 41 and is carried through line 42 to a filtration step—in this case a continuous drum filter. A portion of the slurry supernatant may be recirculated to tank 38 through line 44.

The following examples will serve to illustrate the invention but are not to be construed as limiting the invention.

EXAMPLES

Laboratory Tests:

1. An aqueous chelate solution (500 mL), representing a commercial LO-CAT solution was prepared by dissolving ferric sulfate (0.15 wt.%, total weight basis), nitrilotriacidic acid trisodium salt (1.25 wt.%), sorbitol (0.50 wt.%), and sodium bicarbonate (5 wt.%) in water and diluting to 500 mL. This aqueous chelate solution was placed in a graduated cylinder and air was bubbled through the bottom of the solution through an air controller using a 10 micron stainless steel frit as the gas disperser at a rate of 500 mL per minute. Powdered yellow sulfur (10 g) was added to the aqueous chelate solution. A nonylphenoxy poly(ethoxy) ethanol (IGEPAL CO-430) having an HLB of 8.8 was added dropwise to the aqueous chelate solution as the air was bubbled through. Addition of 0.01 mL of this surfactant corresponded to a concentration of about 20 parts per million (ppm) was effective in completely wetting all of the sulfur and causing the sulfur to rapidly precipitate and settle to the bottom of the reaction container. While the air flow was on, there was little or no foam or sulfur froth formed at the surface of the liquid.

2. A commercial mixture of alkylphenoxy poly(ethoxy) ethanols, UNICHEM 9100 from Unichem, gave nearly identical results as IGEPAL CO-430 at a concentration of about 120 ppm. This corresponds to about 1.6 gallons per long ton of sulfur produced in a plant environment for gas sweetening.

The IGEPAL CO-430 and UNICHEM 9100 surfactants are commercial materials which are marketed and used in the above laboratory tests as aqueous solutions or aqueous alcohol solutions of the surfactant. The amounts of surfactant used in the above laboratory tests are reported as ppm of surfactant, active weight basis.

Field Trials

1. Plant No. 1: An operating LO-CAT $H_2S$ removal facility generating 2.5 long tons of sulfur per day from sweetening a high pressure sour feed with a high $CO_2$ content was experiencing almost daily sulfur carryover into the treated gas recompression suction scrubbers. This required continuous maintenance and frequent shut-downs for cleaning (e.g., the compressor screens had to be leaned at least once per day). The facility used a commercial LO-CAT aqueous chelated iron solution containing NTA-chelated ferric iron, an octylphenoxy(ethoxy) ethanol having an HLB of about 13.5, an alkaline material to adjust the pH to a pH from about 7.5 to about 8.5, and a commercial defoaming agent, NALCO 5740. The surfactant and the defoamer were continuously added as a matter of course during the operation of the plant. The surfactant was added at a rate of about 0.27 gallons per long ton of sulfur produced, and the commercial defoamer was added at a rate of about 0.3 gallons per long ton of sulfur. The operation of the plant was modified by stopping the addition of the octylphenoxy(ethoxy) ethanol and adding instead a nonylphenoxy poly(ethoxy) ethanol having an HLB of 8.5, UNICHEM 9100, at an addition rate of 1.2 gallons per long ton of sulfur. The sulfur carryover was almost completely eliminated by this change in a very short period of time. The sulfur settling rates were noticeably increased compared to the situation with the higher HLB surfactant.

2. Plant No. 2: Another LO-CAT $H_2S$ removal facility generating 6.5 long tons of sulfur per day form a lower pressure sour feed with a high $CO_2$ content used 1.0 gallon of the same commercial octylphenoxy(ethoxy) ethanol per long ton of sulfur. By switching to UNICHEM 9100, a noticeably increases sulfur settling rate was quickly achieved. An addition rate of about 1.2 gallons per long ton of the UNICHEM 9100 appeared to be sufficient for good sulfur setting rates.

In both Plants 1 and 2 the sulfur recovered from the operations using the UNICHEM 9100 surfactant had noticeably larger particle sizes and tended to be less "sticky." The sulfur product was, therefore, easier to handle.

What is claimed is:

1. A composition for oxidizing hydrogen sulfide to form elemental sulfur in the composition and for effecting settling of the elemental sulfur from the composition, said composition comprising an aqueous solution containing chelated water soluble polyvalent metal ions and at least one water soluble nonionic surfactant having an HLB of from 8 to 10.

2. A composition for oxidizing hydrogen sulfide to form elemental sulfur in the composition and for effecting setting of the elemental sulfur from the composition, said composition comprising an aqueous solution containing chelated water soluble polyvalent metal ions and at least one water soluble nonionic surfactant having an HLB of from 8 to 10, wherein said nonionic surfactant is prepared by reacting an alkyl phenol with an alkoxide.

3. A composition as in claim 2 in which the alkyl phenol is an alkyl phenol having from about 8 to 10 carbon atoms in the alkyl group.

4. A composition as in claim 2 in which the alkyl phenol is nonylphenol.

5. A composition as in claim 2 in which the alkoxide is propylene oxide.

6. A composition for oxidizing hydrogen sulfide to form elemental sulfur in the composition and for effecting settling of the elemental sulfur from the composition, said composition comprising an aqueous solution containing chelated water soluble polyvalent metal ions and at least one water soluble ethoxylated alkyl phenol surfactant having an HLB of from about 8 to about 10, in which the HLB is defined as E/5 where E is ethylene oxide weight percent.

7. A composition as in claim 6 in which the polyvalent metal is iron.

8. A composition as in claim 6 in which the alkyl phenol is an alkyl phenol having from about 8 to 10 carbon atoms in the alkyl group.

9. A composition as in claim 6 in which the alkyl phenol is nonylphenol.

10. A composition as in claim 6 in which the surfactant is present in the aqueous solution in an amount sufficient to prevent formation of a layer of sulfur froth on the aqueous solution while maintaining the elemental sulfur concentration in the aqueous solution between about 0.1 weight percent and about 10 weight percent.

11. A composition as in claim 6, in which the surfactant is a surfactant having an HLB of from about 8.5 to about 9.

12. A composition as in claim 6, in which the surfactant is nonylphenoxy poly(ethoxy) ethanol.

13. A composition as in claim 6, in which the ions are chelated with a chelating agent which comprises a mixture of at least one water soluble iron chelating agent selected from the group consisting of polyamino polycarboxylic acids, polyamino alkyl polycarboxylic acids, polyamino hydroxyalkyl polycarboxylic acids, poly(phosphoalkyl) amines, their soluble salts, and mixtures thereof and at least one water soluble chelating agent selected from the group consisting of monosaccharides, disaccharides, reduced monosaccharides, reduced disaccharides, monosaccharide acids, disaccharide acids, their alkali metal salts, and mixtures thereof.

14. A composition as in claim 6, in which the ions are chelated with a chelating agent comprising a mixture of
 (a) a soluble salt of an acid selected from the group consisting of ethylenediaminetetracetic acid, 2-hydroxyethyl ethylenediaminetetracetic acid, and nitrilotriacetic acid, and
 (b) a reduced sugar selected from the group consisting of sorbitol and mannitol.

15. A composition as in claim 6, in which the ions are chelated with a chelating agent comprising a mixture of nitrilotriacetic acid and sorbitol, and said composition contains a nonylphenoxy poly(ethoxy) ethanol nonionic surfactant having an HLB of from about 8.5 to about 9.

16. A process for removing hydrogen sulfide from a fluid stream by contacting said stream with a composition for oxidizing hydrogen sulfide to form elemental sulfur in the composition and for effecting settling of the elemental sulfur from the composition said composition comprising an aqueous solution containing chelated water soluble polyvalent metal ions and at least one water soluble ethoxylated alkyl phenol surfactant having an HLB of from about 8 to about 10, in which the HLB is defined as E/5 where E is ethylene oxide weight percent.

17. A process as in claim 16 in which the polyvalent metal is iron.

18. A process as in claim 16 in which the alkyl phenol is an alkyl phenol having from about 8 to 10 carbon atoms in the alkyl group.

19. A process as in claim 16 in which the alkyl phenol is nonylphenol.

20. A process as in claim 16 in which the surfactant is present in said solution in an amount sufficient to prevent formation of a layer of sulfur froth on the surface of the aqueous solution while maintaining the elemental sulfur concentration in the aqueous solution between about 0.1 weight percent and about 10 weight percent.

21. A process as in claim 16, wherein the ions are chelated with a chelating agent which comprises a mixture of at least one water soluble chelating agent selected from the group consisting of polyamino polycarboxylic acids, polyamino alkyl polycarboxylic acids, polyamino hydroxyalkyl polycarboxylic acids, poly(phosphonoalkyl) amines, their soluble salts, and mixtures thereof and at least one water soluble chelating agent selected from the group consisting of monosaccharides, disaccharides, reduced monosaccharides, reduced disaccharides, monosaccharide acids, disaccharide acids, their alkali metal salts, and mixtures thereof.

22. A process as in claim 16, in which the ions re chelated with a chelating agent comprising a mixture of
   (a) a soluble salt of an acid selected from the group consisting of ethylenediaminetetracetic acid, 2-hydroxyethyl ethylenediaminetetracetic acid, and nitrilotriacetic acid, and
   (b) a reduced sugar selected from the group consisting of sorbitol and mannitol.

23. A process as in claim 16, in which the ions are chelated with a chelating agent comprising a mixture of nitrilotriacetic acid and sorbitol, and said composition contains a nonylphenoxy poly(ethoxy) ethanol nonionic surfactant having an HLB of from about 8.5 to about 9.

* * * * *

UNITED STATES PATENT AND TRADEMARK OFFICE
CERTIFICATE OF CORRECTION

PATENT NO. : 5,026,503

DATED : June 25, 1991

INVENTOR(S) : Robert C. Stewart

It is certified that error appears in the above-identified patent and that said Letters Patent is hereby corrected as shown below:

Col. 2, line 14 & 15, equation reads
"$H_2S(gas) + 2(M\ chelate)^{+3}\ 2H^+ + S^0 + 2(M\ chelate)^{+2}$"
should read --$H_2S(gas) + 2(M\ chelate)^{+3} = 2H^+ + S^\circ + 2(M\ chelate)^{+2}$--.

Col. 2, line 45 reads "f" should read --of--

Col. 7, line 24 reads "leaned" should read --cleaned--

Col. 7, line 46 reads "form" should read --from--

Col. 7, line 50 reads "increases" should read --increased--

Signed and Sealed this

Tenth Day of November, 1992

Attest:

DOUGLAS B. COMER

*Attesting Officer*         *Acting Commissioner of Patents and Trademarks*